United States Patent
Winter et al.

(10) Patent No.: US 12,390,824 B2
(45) Date of Patent: Aug. 19, 2025

(54) MONITORING METHOD FOR AN APPLICATION PLANT AND CORRESPONDING APPLICATION PLANT

(71) Applicant: Dürr Systems AG, Bietigheim-Bissingen (DE)

(72) Inventors: Tobias Winter, Bietigheim-Bissingen (DE); Paul Thomä, Freiberg am Neckar (DE)

(*) Notice: Subject to any disclaimer, the term of this patent is extended or adjusted under 35 U.S.C. 154(b) by 428 days.

(21) Appl. No.: 17/609,429

(22) PCT Filed: May 4, 2020

(86) PCT No.: PCT/EP2020/062242
§ 371 (c)(1),
(2) Date: Nov. 8, 2021

(87) PCT Pub. No.: WO2020/225175
PCT Pub. Date: Nov. 12, 2020

(65) Prior Publication Data
US 2022/0219182 A1    Jul. 14, 2022

(30) Foreign Application Priority Data
May 9, 2019 (DE) .................... 10 2019 112 099.3

(51) Int. Cl.
*B05B 12/00* (2018.01)
*G05B 19/418* (2006.01)
*G05B 23/02* (2006.01)

(52) U.S. Cl.
CPC .......... *B05B 12/006* (2013.01); *G05B 19/418* (2013.01); *G05B 23/0221* (2013.01); *G05B 23/024* (2013.01)

(58) Field of Classification Search
CPC .... G05B 19/41875; G05B 2219/32368; G05B 2219/32191; G05B 19/418;
(Continued)

(56) References Cited

U.S. PATENT DOCUMENTS

| | | |
|---|---|---|
| 5,481,260 A | 1/1996 | Buckler et al. |
| 5,808,559 A | 9/1998 | Buckler |

(Continued)

FOREIGN PATENT DOCUMENTS

| | | |
|---|---|---|
| CN | 102686252 A | 9/2012 |
| CN | 106249728 A | 12/2016 |

(Continued)

OTHER PUBLICATIONS

STAT 555 Lesson 16-Multivariate statics and dimension reduction (Year: 2014).*

(Continued)

*Primary Examiner* — Mohammad K Islam
(74) *Attorney, Agent, or Firm* — Taft Stettinius & Hollister LLP; Thomas E. Bejin; John W. Carpenter

(57) ABSTRACT

The disclosure relates to a monitoring method for an application plant for applying an application agent for a painting plant for painting motor vehicle body components. The following are included: having the following steps:
  Determination of first raw sensor data representing an operating variable of the application plant,
  acquisition of first control signals for controlling the application plant, and
  extracting features from the first raw sensor data, the features comprising a reduced amount of data compared to the first raw sensor data and serving as a data basis for a machine learning algorithm.

12 Claims, 6 Drawing Sheets

(58) Field of Classification Search
CPC .............. G05B 23/0221; G05B 23/024; G05B 23/0243; G05B 23/0294; G05B 2219/32015; G05B 2219/33299; G05B 2219/34427; Y02P 90/02; B05B 12/006; B05B 15/00; H02H 7/0844
See application file for complete search history.

(56) References Cited

U.S. PATENT DOCUMENTS

| | | | |
|---|---|---|---|
| 5,999,106 | A | 12/1999 | Buckler |
| 6,609,036 | B1 | 8/2003 | Bickford |
| 7,536,274 | B2 * | 5/2009 | Heavner, III ............ F23N 5/003 702/183 |
| 8,567,694 | B2 | 10/2013 | Herre |
| 8,606,544 | B2 * | 12/2013 | Miller .................... G05B 17/02 702/185 |
| 10,532,542 | B2 | 1/2020 | Wade |
| 2004/0236472 | A1 | 11/2004 | Junk et al. |
| 2009/0198474 | A1 * | 8/2009 | Fritz .................... G01D 21/00 702/183 |
| 2010/0164717 | A1 | 7/2010 | Hammer et al. |
| 2010/0274378 | A1 | 10/2010 | Herre |
| 2012/0254141 | A1 | 10/2012 | Poland et al. |
| 2013/0173218 | A1 * | 7/2013 | Maeda .................... G06F 17/00 702/182 |
| 2014/0334723 | A1 | 11/2014 | Chatow et al. |
| 2015/0169393 | A1 * | 6/2015 | Shibuya ............. G05B 23/0243 702/182 |
| 2015/0276557 | A1 * | 10/2015 | Masuda ............. G01M 99/008 702/182 |
| 2016/0313294 | A1 * | 10/2016 | Dattilo ................... G06Q 10/10 |
| 2017/0043359 | A1 | 2/2017 | Dufault et al. |
| 2017/0050208 | A1 | 2/2017 | Nichols et al. |
| 2017/0072419 | A1 | 3/2017 | Meissner et al. |
| 2017/0308049 | A1 | 10/2017 | Fujii et al. |
| 2018/0293673 | A1 | 10/2018 | Ortiz Obando |
| 2019/0061062 | A1 | 2/2019 | Kubo |
| 2019/0099886 | A1 | 4/2019 | Chattopadhyay et al. |
| 2020/0012270 | A1 * | 1/2020 | Hollender .......... G05B 23/0229 |
| 2021/0256428 | A1 * | 8/2021 | Düll ........................ G06N 3/08 |

FOREIGN PATENT DOCUMENTS

| | | |
|---|---|---|
| CN | 107073627 A | 8/2017 |
| CN | 109270907 A | 1/2019 |
| DE | 102007062132 A1 | 7/2009 |
| DE | 102016217948 A1 | 3/2018 |
| DE | 102018214170 A1 | 2/2019 |
| EP | 0753170 A1 | 1/1997 |
| EP | 3451087 A1 | 3/2019 |
| JP | 2007508937 A | 4/2007 |
| JP | 2017199074 A | 11/2017 |
| JP | 2019523512 A | 8/2019 |
| WO | 2015185211 A2 | 12/2015 |
| WO | 2017212486 A1 | 12/2017 |

OTHER PUBLICATIONS

EPO Office Action for related application No. 20723851.0 mailed May 22, 2023 (12 pages; with English machine translation).
International Search Report and Written Opinion for PCT/EP2020/062242 mailed Jul. 16, 2020 (19 pages; with English translation).
Fayyad U.; Patetsky-Shapiro, G.; Smyth, P.: "From Data Mining to Knowledge Discovery in Databases", AI Magazine, vol. 17, No. 3 (1996).
Bremer, M.: "Principles of Data Mining", Springer-Verlag (2009).
German Patent and Trademark Office Search Report mailed Jan. 28, 2020 for Application No. DE10 2019 112 099.3 (7 pages; with English machine translation).
Intellectual Property India Examination Report for related application No. IN202147055825 mailed Jul. 17, 2023 (6 pages).
JPO Notification of Reasons for Rejection in related application JP2021-566257 mailed Dec. 27, 2023 (7 pages; with English translation).
China State Intellectual Property Office First Notice of Examination and Search Report mailed Feb. 27, 2024 for related application No. CN202080034709.7 (24 pages; with English translation).
Intellectual Property India Hearing Adjournment Notice with Objections for related application No. IN202147055825 mailed Sep. 2, 2024.
Korean Intellectual Property Office Notice of Preliminary Rejection for related application No. 10-2021-7040003 mailed Apr. 21, 2025 (13 pages; English translation available).

* cited by examiner

MONITORING METHOD FOR AN APPLICATION PLANT AND CORRESPONDING APPLICATION PLANT

CROSS-REFERENCE TO RELATED APPLICATIONS

This application is a national stage of, and claims priority to, Patent Cooperation Treaty Application No. PCT/EP2020/062242, filed on May 4, 2020, which application claims priority to German Application No. 10 2019 112 099.3, filed on May 9, 2019, which applications are hereby incorporated herein by reference in their entireties.

The disclosure relates to a monitoring method for an application plant for applying an application agent, in particular for a painting plant for painting motor vehicle body components. Furthermore, the disclosure comprises a correspondingly designed application plant.

BACKGROUND

In modern painting plants for painting motor vehicle body components, the operation is controlled by control signals, with numerous sensors detecting operating variables of the painting plant and generating raw sensor data, so that the operating state of the painting plant can be monitored by evaluating the raw sensor data and the control signals. However, the monitoring methods used to date to monitor the operation of painting plants are not yet fully satisfactory.

DE 10 2007 062 132 A1 discloses a monitoring method for an application plant for applying an application agent, in particular for a painting plant for painting motor vehicle body components. Herein, raw sensor data is determined and control signals are recorded and used for function checking.

DE 10 2018 214 170 A1 discloses a method and a device for performing a quality assessment of a technical system, with raw sensor data ("image data") and control signals ("observation condition data") serving as the data basis for a machine learning algorithm.

The publication DE 10 2016 217 948 A1 describes a method for predicting the quality of adhesive joints, wherein the adhesive joint is applied by an adhesive processing device that has, among other things, an application device for applying adhesive. The analysis of the measured data is performed by comparison with a data model. The statistical data model, which has been created by means of a multivariate analysis method, can thereby be optimized by machine learning.

DETAILED DESCRIPTION

Figure 1:
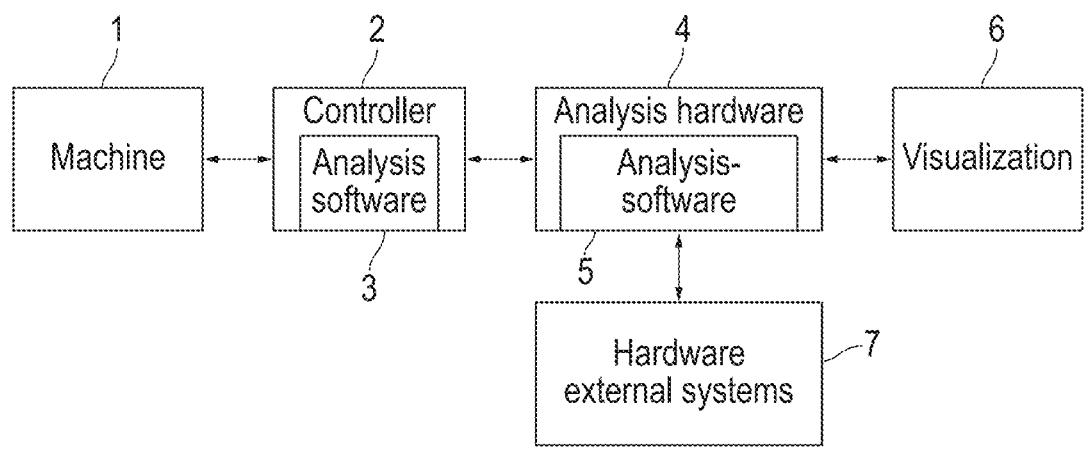
FIG. 1 a schematic representation of the system structure according to the disclosure for monitoring an application plant, FIG. 2 a schematic representation of the structure of the analysis software, FIG. 3 a schematic representation of the mode of operation of the analysis software for the feature extraction, FIG. 4 a flow chart to illustrate the monitoring method according to the disclosure, FIG. 5 a timing diagram to illustrate the feature extraction, FIG. 6 a flowchart illustrating the monitoring method according to the disclosure, as well as FIG. 7 a time diagram illustrating feature extraction taking into account multiple control signals and multiple raw sensor data.

The disclosure is based on the technical knowledge that machine learning methods can be advantageously used for monitoring an application plant (e.g. painting plant), such as those known from Fayyad U.; Patetsky-Shapiro, G.; Smyth, P.: "From Data Mining to Knowledge Discovery in Databases", AI Magazine, Vol. 17, No. 3 (1996). A further literature source for machine learning methods is Bremer, M.: "Principles of Data Mining", Springer-Verlag (2009).

In accordance with known monitoring methods, the monitoring method according to the disclosure first provides for determining first raw sensor data reflecting an operating variable of the application plant. For example, the first raw sensor data may reflect, as an operating variable, the shaping air pressure of shaping air used to form a spray jet of a rotary atomizer. However, the first raw sensor data can also reflect other operating variables of the application plant, as will be explained in more detail below.

Furthermore, the monitoring method according to the disclosure also provides, in accordance with known monitoring methods, that first control signals are acquired for controlling the application plant. For example, the first control signals may define the target value of the shaping air flow used to form a spray of a rotary atomizer. However, the first control signals can also be used to set other operating variables of the application plant, as will be explained in more detail below.

Thus, the control signals together with the raw sensor data form signal sets which are evaluated within the scope of the disclosure. For example, a signal set can take into account the setpoint value of the shaping air flow as the control signal and the actual signal of the shaping air pressure as the raw sensor data. However, a signal set may also include more than one actual signal and more than one control signal. In general, a signal set may comprise 1 ... m different control signals and 1 ... k different actual signals, whereby the signals may also belong to different control loops.

The monitoring method according to the disclosure is distinguished from the prior art in that so-called features are extracted from the first raw sensor data, the features comprising a reduced amount of data compared to the first raw sensor data and serving as a data basis for a machine learning algorithm.

The term "features" used in the context of the disclosure has first the meaning that the amount of data is reduced by the feature extraction, i.e. the extracted features have a reduced amount of data compared to the raw sensor data.

In addition, the notion of "features" used in the context of the disclosure has the meaning that the features abstract from the exact operational process without losing information relevant for state detection. For example, it is no longer necessary to compare only exactly identical sequences of identical workpiece variants (e.g. body variants). Rather, it is sufficient, for example, to compare similar "brushes" in completely different car bodies.

Furthermore, the term "features" used in the context of the disclosure has the meaning that the features are suitable as a data basis for machine learning algorithms, whereby the machine learning algorithms known per se are based on the extracted features. The features thus form a bridge between the raw sensor data on the one hand and the machine-learning algorithms on the other, which often only enables stable data evaluation by machine-learning algorithms that can be mastered with limited resources.

In a preferred embodiment of the disclosure, first and second raw sensor data reflecting different operating variables of the application plant are determined, and features are extracted from both the first raw sensor data and the second raw sensor data, which can then serve as a database for a machine-learning algorithm. For example, the first raw sensor data can represent the shaping air flow as an operating variable, while the second raw sensor data can represent the speed of a drive turbine of a rotary atomizer. However, the first and second raw sensor data may also reflect other operating variables of the application plant, as will be described in more detail below.

Preferably, feature extraction from the first and second raw sensor data, respectively, is performed as follows.

In a step, an observation time window is first defined within which the first or second raw sensor data is to be evaluated. For example, the observation time window can be a car body cycle, i.e. the period between the feeding of a motor vehicle body to be painted into a paint booth and the feeding of the next motor vehicle body into the paint booth. This has the advantage that statuses and monitoring are possible during the normal production process. With regard to the viewing window, however, there are various possibilities within the scope of the disclosure, which will be described in detail below.

In a further step, the observation time window is then divided into individual sections, so-called comparison periods. In this way, the comparison periods can be defined by changes (jumps) in control signals. For example, a new comparison period is started each time a control signal relevant to the application is changed within a body cycle. For example, the setpoint of the shaping air flow of a rotary atomizer can be evaluated for this purpose. However, within the scope of the disclosure, various other control signals can also be evaluated to determine the comparison period, as will be described in detail.

In a further step, the comparison period itself is then subdivided into several successive subsections, the subdivision being predetermined by parameters.

For example, the comparison period can be divided into 0 . . . n initial regulating phases, 0 . . . m subsequent regulated phases and 0 . . . 1 subsequent residual phase as subsections.

The regulation phases are in the initial time phase within the comparison time period, in which the first and/or second raw sensor data react to the jump of the first and/or second control signal, so that one cannot speak yet of the stationary condition.

The regulated phases are in the period after the regulating phase, in which the first and/or second raw sensor data have reacted at least partially to a control signal jump.

The method itself does not necessarily check whether the raw sensor data in the regulating phases or in the regulated phases have oscillated or not. Rather, the subdivision into regulation phases and regulated phases is fixed by parameters, i.e. by the predefined time duration of the regulation phase and the likewise predefined time duration of the regulated phase.

The residual phase is the remaining period of time after the regulation phases and the regulated phases until the end of the comparison period. In this case, it is possible that the comparison period contains a single residual phase or no residual phase at all. For example, if the sum of the regulating phases and the regulated phases is exactly equal to the duration of the comparison period, then the comparison period does not contain any residual phase.

The regulated phase and the residual phase are optional in the event that the comparison period is sufficiently long to include the regulated phase(s) and the residual phase in addition to the regulated phase(s). However, if the comparison period is relatively short, the comparison period may be divided into only a regulating phase and a residual phase. If the comparison period is very short, it is even possible that the comparison period contains only one regulating phase and no regulated phase at all.

In a further step, at least one statistical parameter is then calculated for the individual subsections for the first and/or second raw sensor data and, if necessary, for further raw sensor data within the individual subsections, the calculated statistical parameter then being a component of the extracted features.

It has already been briefly mentioned above that the comparison period may be limited by jumps or changes in control signals, i.e. one change in a control signal starts a comparison period and the next change in a control signal ends the current comparison period and starts the next comparison period.

In one variant of the disclosure, the comparison period is limited by changes (jumps) of the same control signal. In this case, only one control signal is evaluated when determining the comparison period, e.g. the setpoint for the shaping air flow of a rotary atomizer. The possible jumps of other control signals, on the other hand, are not used to determine the comparison period in this variant of the disclosure.

In another disclosure variant several control signals are used to define the comparison period. Here, too, the comparison period is limited by changes or jumps in the control signals. However, different types of control signals are evaluated. For example, a jump of one control signal can mark the start of the comparison period, while a jump of the other control signal marks the end of the current comparison period and the start of the next comparison period.

It has already been briefly mentioned above that the statistical characteristic determined in the individual subsections of the comparison period is a component of the extracted features. However, it is also possible within the scope of the disclosure for the extracted features to contain further information. For example, the features may include the amount of setpoint changes in the control signals and the time period since the last change, to name a few examples.

Furthermore, it has already been mentioned above that the comparison period is subdivided into subsections, namely for example 0 . . . n regulating phases, 0 . . . m regulated phases and 0 . . . 1 residual phase. At this point it is again pointed out that the comparison period does not necessarily have to contain several regulating phases and several regulated phases. For example, it is also possible that the comparison period contains only one regulating phase. The number of subsections and the time duration of the subsections can be determined here as a function of the time constant of the raw sensor data. For this purpose, the time constant of the first and/or second raw sensor data is determined and the number of subsections in the comparison period, the time duration of the single regulating phase and/or the time duration of the single regulated phase are then determined as a function of the determined time constant. Only one time constant is selected per use case, which may also contain several control and sensor data.

However, it is alternatively also possible that the time duration of the individual regulating phases and/or the individual regulated phases is determined randomly.

It has already been mentioned above that the observation time window can, for example, be a body cycle. This is a component-related time period that is related to the component to be coated, namely specifically to the motor vehicle body component to be painted. However, the observation time window can alternatively also be another component-related time period, such as, for example, the time period required for preparing the application plant for the subsequent coating of a component to be coated.

Furthermore, it is possible within the scope of the disclosure that the observation time window is an application plant-related time period, such as the time period of a setup operation, a test operation, a manual operation or a maintenance operation.

Furthermore, it is also possible that the observation time window is a time-related time period, such as an hour, a day, a week, a month, a quarter, or a year. Another example of a time-related period as an observation time window is the shift length of a work shift.

It has already been mentioned above that a statistical parameter is determined in the individual subsections, which is then a component of the extracted features.

In one variant of the disclosure, this statistical parameter is a uni-variate parameter that considers only one type of raw sensor data. Examples of such a uni-variate statistical parameter are the arithmetic or geometric mean, the median value, the variance, the maximum value or the minimum value within a subsection, where the uni-variate statistical parameter is always related to the same raw sensor data, i.e. to a single operating variable.

In another variant of the disclosure, the statistical parameter is a multivariate statistical parameter calculated from different raw sensor data. Examples of such multivariate statistical parameters are the Pearson correlation coefficient and the rank correlation coefficient. However, it is also possible that the multivariate statistical parameter takes into account three or more different raw sensor data of a signal set.

Furthermore, it should be noted that the disclosure is not limited with respect to the raw sensor data to be evaluated. Rather, within the scope of the disclosure, a wide variety of raw sensor data can be evaluated, which are generated during the operation of an application plant. The following raw sensor data can be mentioned by way of example:
  Speed of a turbine of a rotary atomizer,
  air pressure of drive air for driving a turbine of a rotary atomizer,
  coating agent pressure at a paint pressure regulator,
  charging current of an electrostatic coating agent charging system,
  charging voltage of an electrostatic coating agent charging system,
  humidity in a coating booth,
  air pressure of shaping air for forming a spray of coating agent,
  flow rate of shaping air for forming a spray of the coating agent,
  air temperature in a coating booth,
  position of a paint impact point of an application device,
  speed of movement of a paint impact point of an application device,
  valve position of a valve, in particular a coating agent valve, a flushing agent valve, a pulsed air valve or a lubricant valve,
  drive variable of a drive, in particular of a robot drive, in particular of position, speed, acceleration, current, voltage, power or temperature,
  flow rate of a coating agent pump or a dosing unit,
  position of a linear conveyor which conveys the components to be coated through the applicator,
  flow rate, temperature and pressure of material, or
  speed of a swirl applicator.

It has already been mentioned above that various raw sensor data can be evaluated as part of the monitoring process according to the disclosure. In this monitoring of different raw sensor data, any combination of the above examples of raw sensor data is possible. For example, the rotational speed of a turbine of the rotary atomizer can be evaluated together with the flow rate of the coating agent, to name just one example. Furthermore, it is also possible within the scope of the disclosure for more than two different types of raw sensor data to be evaluated, with any combination of the above examples of raw sensor data being possible.

For example, the raw sensor data may reflect an operating variable of one of the following components of the application plant:
  Motor,
  robot joint of a coating robot,
  drive controller of a robot drive of a coating robot,
  turbine for driving a rotary atomizer,
  shaping air controller for controlling a flow of shaping air by shaping a spray of an atomizer,
  pump, in particular coating agent pump,
  metering device for metering the coating agent,
  valve, in particular proportional valve,
  paint pressure regulator,
  high-voltage generator for electrostatic coating agent pickup,
  switch,
  sensor,
  heating,
  control system,
  electric fuse, electric battery,
  uninterruptible power supply,
  uninterruptible signal transmission,
  transformer,
  fluid lines, in particular hoses or pipes, for transporting fluids, in particular coating agents, thick materials, adhesives, thinners, air or water, or
  swirl applicator.

With regard to the provision of the raw sensor data, there are various possibilities within the scope of the disclosure. For example, the raw sensor data can be measured continuously and then evaluated. Alternatively, the raw sensor data can be read out from a database, provided that the raw sensor data were measured earlier with a time delay.

It was mentioned above that the features extracted from the raw sensor data serve as a database for machine learning algorithms. These machine learning algorithms typically use so-called rules that are applied to the features and allow inference about the operating state of the plant. To create this rule, historical raw sensor data can be used that was measured and stored earlier, with so-called labels reflecting the operating state (e.g., fault-free or faulty) of the application plant during the measurement of the historical raw sensor data. The features are then extracted from the historical raw sensor data in the manner described above. Subsequently, rules are determined by means of a machine learning algorithm from the features extracted from the historical raw sensor data on the one hand and from the known labels on the other hand. The rules determined in this way can then later be applied to features extracted from currently measured raw sensor data.

The evaluation of the features extracted from the currently measured raw sensor data can be used, for example, to identify the operating state of the application plant. For example, it is possible to detect one of the following conditions:

Wear or defect of a paint pressure controller,
Wear or defect of a mixer that mixes several components of a coating agent with each other,
Wear or defect of a pump, in particular a coating agent pump,
Wear or defect of a valve, in particular a valve for controlling coating, thick matter, adhesive, thinner, air or water,
Wear or defect of a heater,
wear or defect of a drive motor,
electrical contact defects,
detection of air pockets in the paint or interruption of the paint supply,
characteristics of an operating medium of the application plant, in particular of air, water, varnish, adhesive or thick matter,
Evaluation of the application and movement program for stress on the machine components or equipment,
Detection of ejection of a bell cup of a rotary atomizer,
Detection of contamination and/or moisture on an atomizer,
Detection of anomalies in the operating behavior of motors, pumps, pistons, shaping airs, fans, turbines, high voltage, pressure flow regulators,
General detection of anomalies in the sense of a significant deviation of the signal curve from the normal curve, or
Prediction of maintenance intervals.

Furthermore, it should be mentioned that the term application plant used in the context of the disclosure is to be understood in general terms and includes, among other things, painting plants for painting motor vehicle body components. However, the disclosure can also be used, for example, in systems for bonding, sealing or insulating. The concept of an application agent used in the context of the disclosure is therefore to be understood in general terms and includes, among other things, paints and thick materials, such as adhesives or insulating materials.

Furthermore, it should be mentioned that the disclosure does not only claim protection for the monitoring method according to the disclosure described above. Rather, the disclosure also claims protection for a corresponding application plant comprising an applicator (e.g., rotary atomizer), a manipulator (e.g., multi-axis painting robot), a sensor for measuring raw sensor data, and a control device that controls the application plant. The application plant according to the disclosure is characterized by the fact that the control device executes the monitoring method according to the disclosure described above.

It should be mentioned here that the control device in this sense can be distributed over several hardware components. It should also be mentioned that it does not have to be the application plant control. The monitoring may run on a completely different hardware that has nothing at all to do with the application plant control.

FIG. 1 shows the system structure of a system according to the disclosure with a machine 1, a controller 2 with an embedded analysis software 3, an analysis hardware 4 with an analysis software 5, a visualization 6 and a hardware 7 belonging to external systems.

In this embodiment example, the machine 1 is a painting plant for painting motor vehicle body components with all its components.

Here, the controller 2 outputs control signals to the machine 1 and receives raw sensor data from the machine 1, and the raw sensor data can be analyzed by the analysis software 3.

In addition, the raw sensor data can also be evaluated by the analysis software 5 of the analysis hardware 4.

Figure 2:
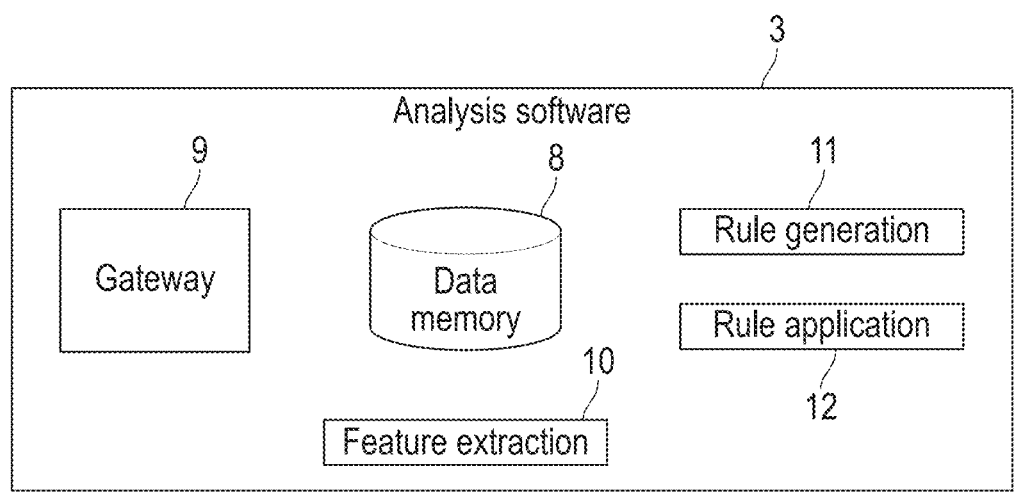

FIG. 2 shows a schematic representation of the modular structure of the analysis software 3 or 5.

Thus, the analysis software 3 has access to a data memory 8 and to a gateway 9 for communication with the other components, such as the machine 1 or the hardware 7.

Furthermore, the analysis software 3 comprises a feature extraction module 10, a rule generation module 11 and a rule application module 12.

Figure 3:
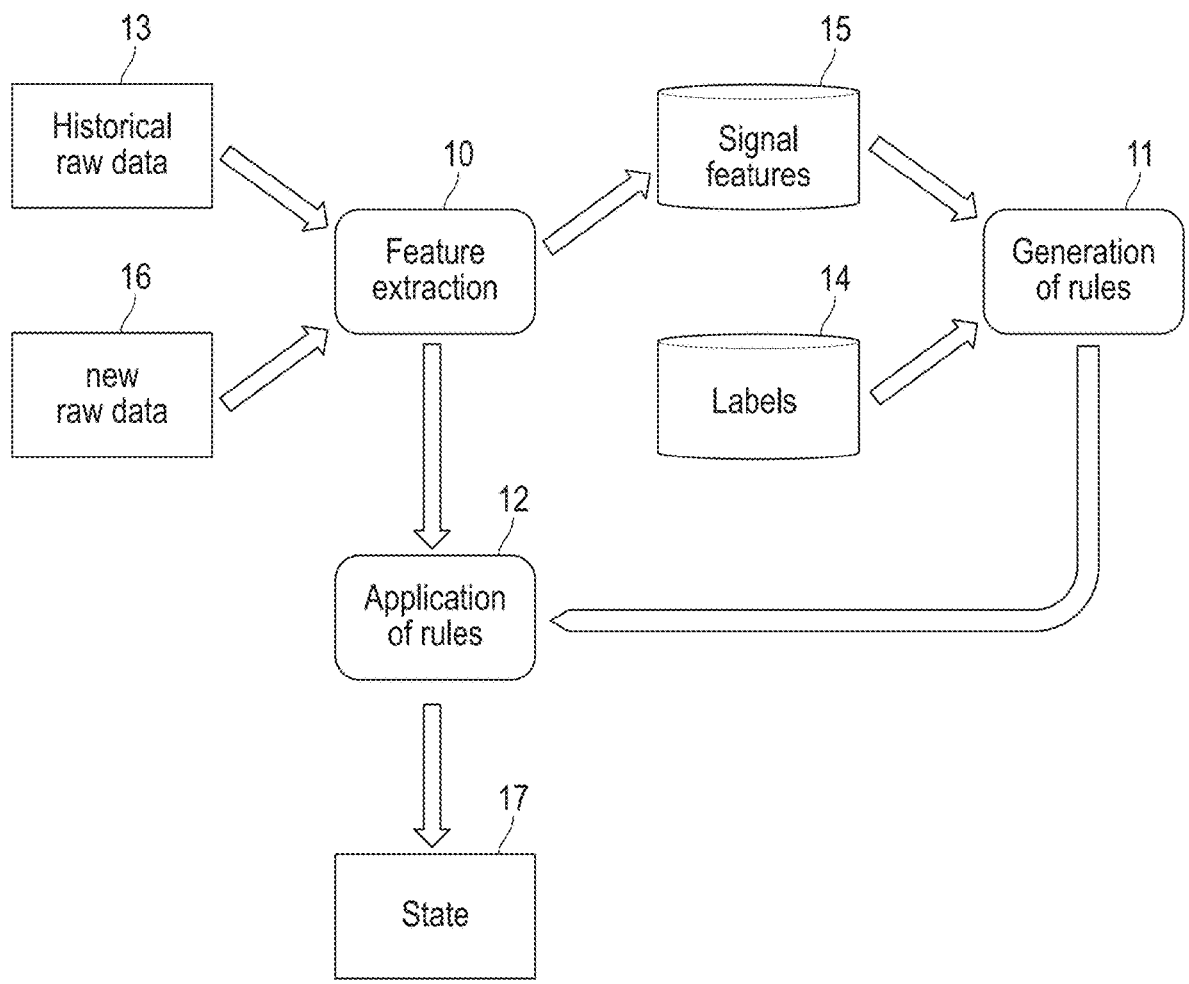

FIG. 3 shows a schematic diagram to illustrate the monitoring method according to the disclosure.

First, the feature extraction module 10 extracts features from historical raw data 13 previously measured at a known operating state of the machine 1, where the known operating state of the machine 1 is represented by labels 14. The feature extraction module 10 then extracts features 15 from the historical raw sensor data 13, as will be described in detail. The feature extraction by the module 10 has the task of reducing the data volume of the historical raw sensor data 13, so that subsequently a machine learning algorithm can be based on the features 15.

The module 11 then uses the extracted features 15 and the known labels 14 to create rules that are then used to later evaluate currently measured raw data 16.

In the normal course of operation, the module 10 then extracts features again from the currently measured new raw sensor data 16, and the module 12 applies the previously determined rules to the extracted features to determine a state 17 of the machine 1.

Figure 4:
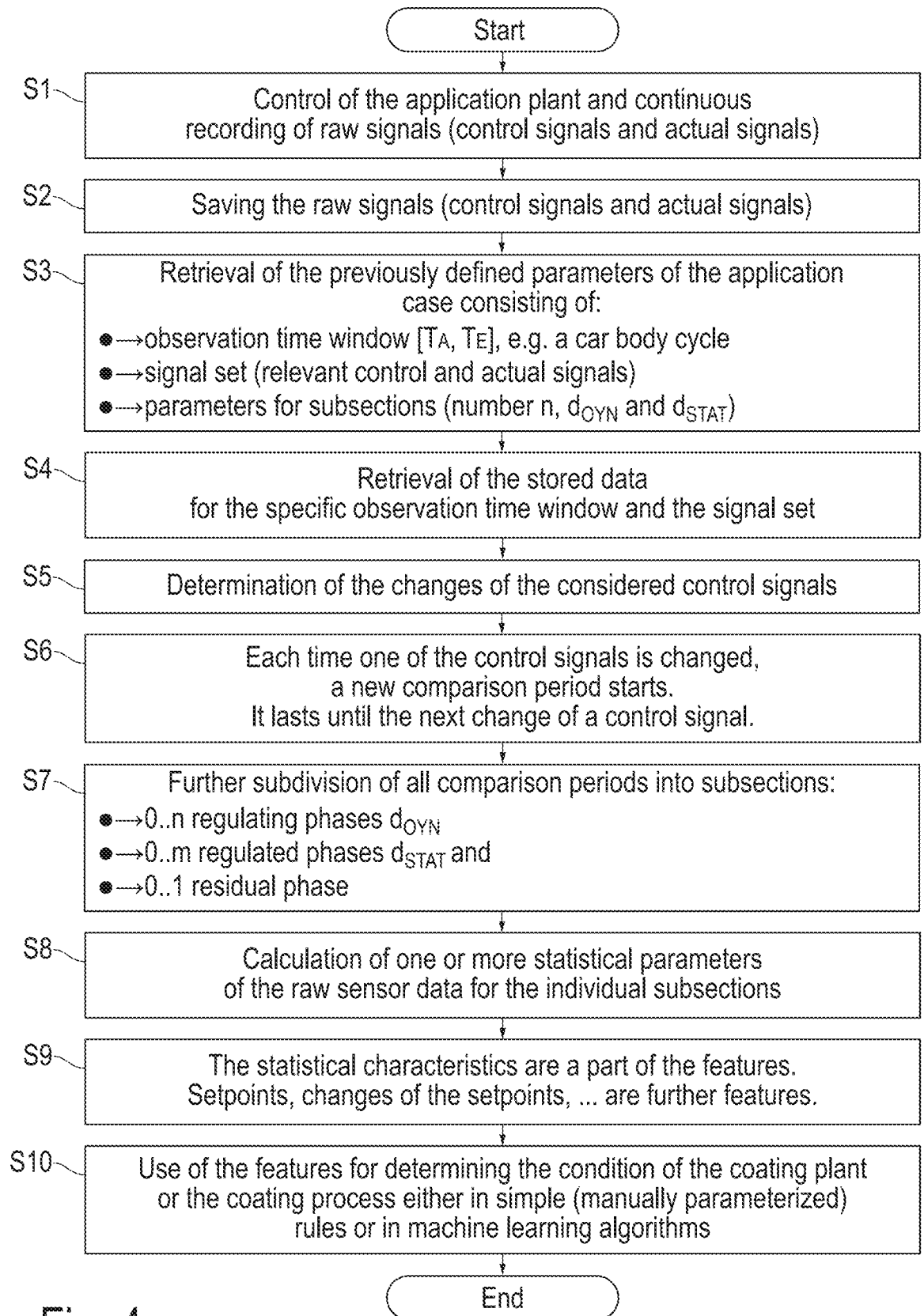

In the following, the flow chart according to FIG. 4 will now be described, with reference to the time diagram according to FIG. 5.

In a first step S1 the application plant is controlled, whereby raw signals are recorded, i.e. on the one hand control signals for controlling the application plant and on the other hand actual signals (raw sensor data), which are measured by sensors and represent operating variables of the application plant.

The raw signals (control signals and actual signals) are then stored in a step S2.

In a step S3, previously defined parameters of the respective application are then retrieved. On the one hand, this includes the observation time window $[T_A, T_E]$, which can be a car body cycle, for example. On the other hand, the retrieved parameters also define the selection of the desired signal set, i.e. the control signals and the actual signals to be evaluated. Finally, the retrieved parameters also include parameters for dividing the comparison periods [t1, t2] into subsections, such as the number n of the regulating phases $d_{DYN}$, the duration of the regulating phases $d_{DYN}$, and the duration of the regulated phases $d_{STAT}$. There are as many static regulated phases $d_{STAT}$ as still fit into the comparison period after subtracting the regulating phases $d_{DYN}$.

In a step S4, the previously stored data of the raw signals (control signals and actual signals) are then retrieved, specifically for the observation time window $[T_A, T_E]$ and for the signal set, which were determined in step S3.

Figure 5:
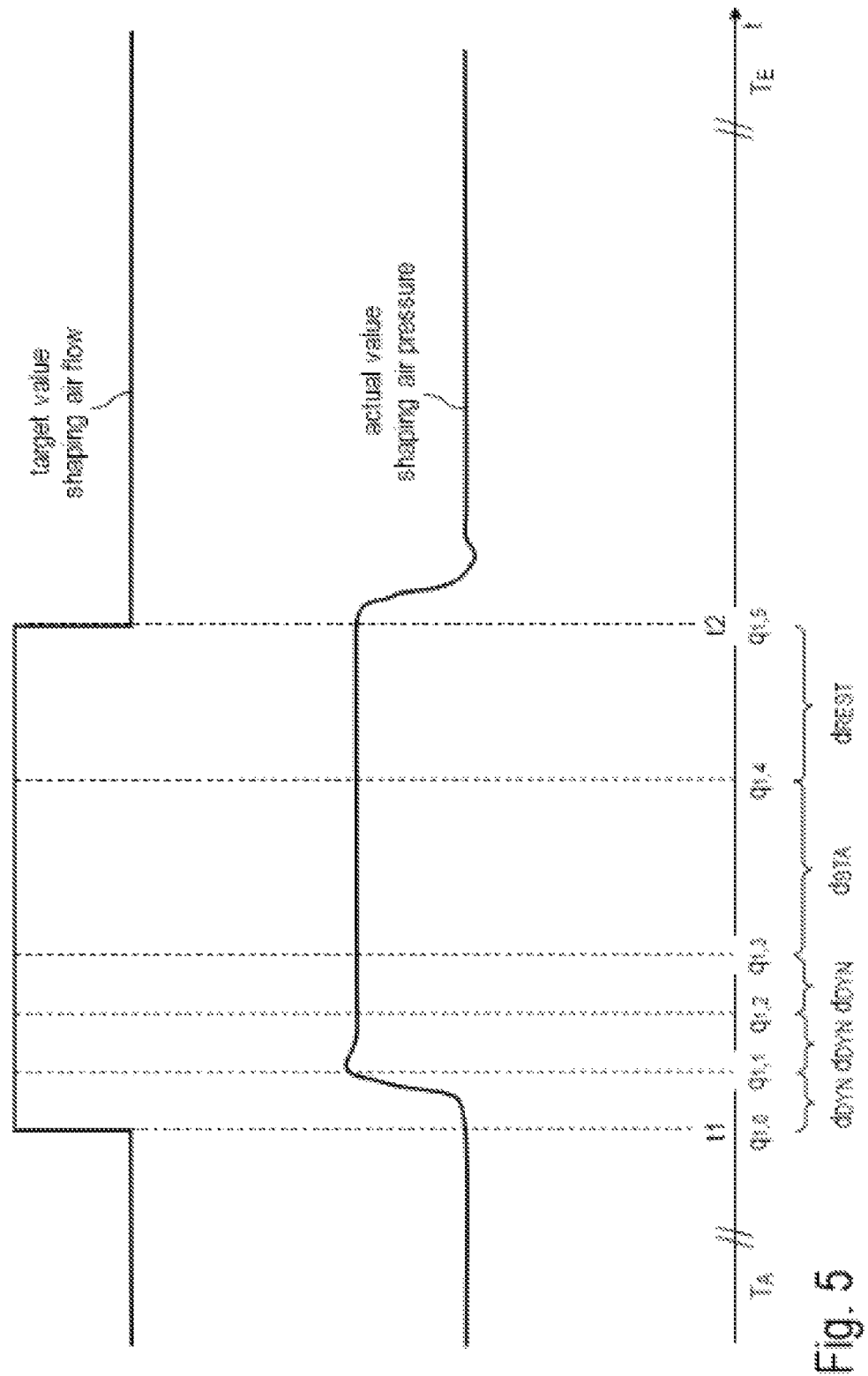

In a step S5, changes of the considered control signals are then determined, whereby these changes occur in the time diagram according to FIG. 5 at the times t1 and t2.

Subsequently, in a step S6, at least one comparison time period [t1, t2] is determined, which starts with the change of the control signal at time t1 and ends with the next change of the control signal at time t2. Usually, several comparison periods are considered.

In a step S7, this comparison period [t1, t2] is then divided into subsections depending on the parameters retrieved in step S3. Depending on the duration of the comparison period [t1, t2], the duration of the regulating phase $d_{DYN}$ and the duration of the regulated phase $d_{STAT}$, the comparison period [t1, t2] is then divided into 0 . . . n regulating phases $d_{DYN}$, 0 . . . m regulated phase $d_{STAT}$ and 0 . . . 1 residual phase. In the time diagram according to FIG. 5, the comparison period [t1, t2] consists of three regulating phases $d_{DYN}$ and two regulated phases $d_{STAT}$. However, this is only an example, i.e. the comparison period [t1, t2] can also be composed of subsections in a different way.

In step S8, a univariate statistical characteristic of the raw sensor data is determined for each of the individual sections, i.e. the actual signals measured by the sensors and representing an operating variable of the application plant. The time diagram according to FIG. 5 specifically shows that the shaping air flow of a rotary atomizer is measured as the actual signal. However, depending on the signal set retrieved in step S3, other actual signals can also be used to calculate the statistical parameter. For example, this univariate statistical parameter may be an arithmetic mean, to give just one example.

In step S9, the features are then determined, with the univariate statistical characteristics calculated in step S8 being a component of these features. Other components of the features are target values and changes of the target values.

In step S10, the features are then used to determine the state of the application plant, which can be done either in simple (manually parameterized) rules or in machine learning algorithms.

Figure 6:
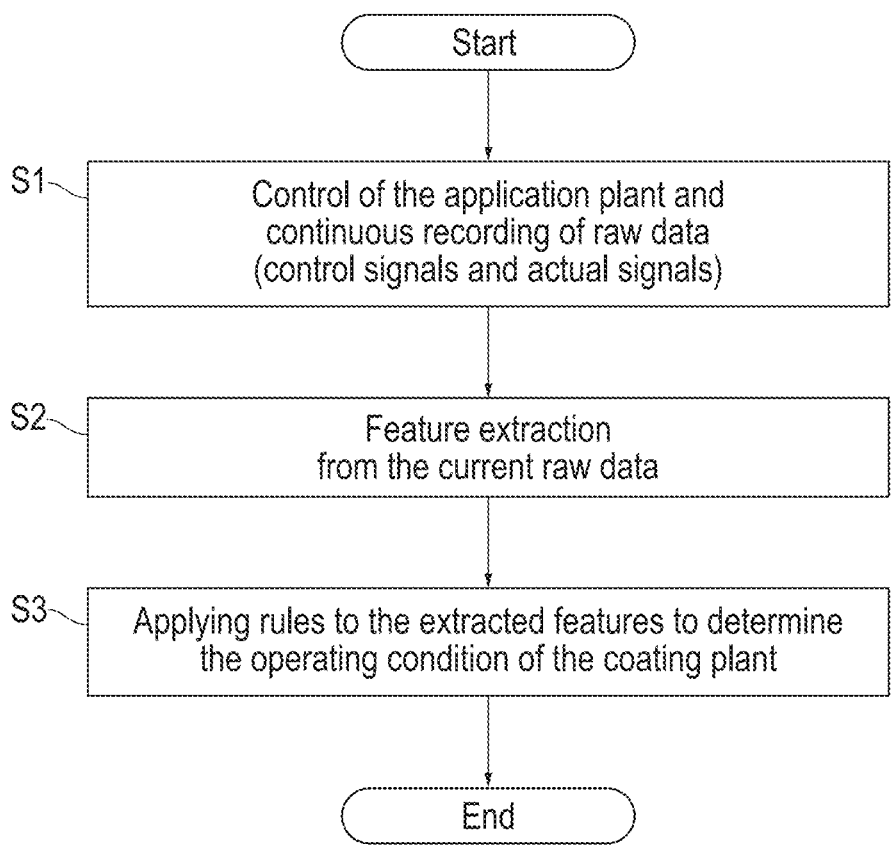

FIG. 6 shows a flowchart that, in addition to measuring raw sensor data in step S1 and extracting features in step S2, also shows the application of rules to the extracted features in step S3.

Figure 7:
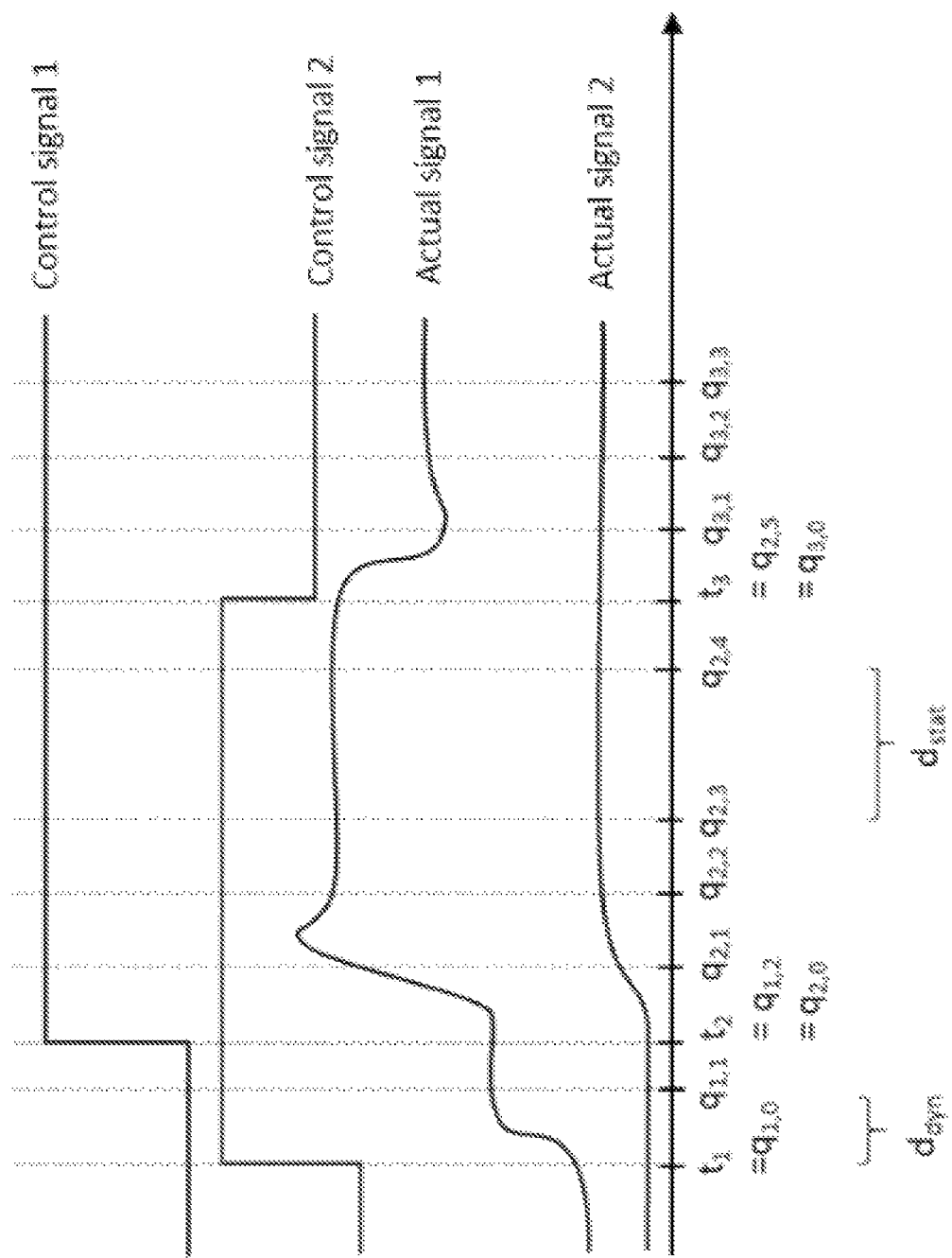

FIG. 7 shows a modification of the time diagram according to FIG. 5, where two control signals and two actual signals are shown. The comparison period is limited by the jumps of the two control signals.

A first comparison period lies between the times t1 and t2. A second comparison period lies between the times t2 and t3.

The above-mentioned comparison periods can then again be divided into subsections in the manner described above.

In addition, statistical parameters are again calculated for the individual subsections, although these can also be multivariate parameters which are calculated from the two actual signals, for example. An example of such a multivariate statistical parameter is the Pearson correlation coefficient.

The disclosure is not limited to the preferred embodiments described above. Rather, a large number of variants and variations are possible which also make use of the inventive concept and therefore fall within the scope of protection. In particular, the disclosure also claims protection for the subject matter and the features of the dependent claims independently of the claims referred to in each case and in particular also without the features of the main claim. The disclosure thus comprises different aspects of the disclosure which enjoy protection independently of each other.

LIST OF REFERENCE SIGNS

1 Machine
2 Controller
3 Analysis software
4 Analysis hardware
5 Analysis software
6 Visualization
7 Hardware
8 Data memory
9 Gateway
10 Feature extraction module
11 Rule creation module
12 Rule application module
13 Historical raw data
14 Labels
15 Features
16 New raw data
17 State of the machine
$d_{DYN}$ Regulating phase
$d_{STAT}$ Regulated phase
$[T_A, T_E]$ Observation time window
[t1, t2] Comparison period

The invention claimed is:

1. A monitoring method for a painting plant for applying an application agent, comprising:
  receiving first raw sensor data from a first sensor included in the painting plant representing a first operating variable of the painting plant;
  receiving second raw sensor data from a second sensor included in the painting plant reflecting a second operating variable of the painting plant;
  acquisition of first and second control signals for controlling the painting plant;
  extracting features from the first raw sensor data and the second raw sensor data, the features comprising a reduced amount of data compared to the first raw sensor data and the second raw sensor data and outputting the features to a machine learning algorithm;
  determining an operating state of the painting plant based on rules included in the machine learning algorithm, wherein the rules included in the machine learning algorithm are obtained by the following steps:
    retrieving stored historical raw sensor data,
    extracting features from the historical raw sensor data, and
    determining the rules by means of the machine learning algorithm by evaluating the features determined from the historical raw sensor data and the associated labels;
  wherein extracting features from the first raw sensor data and the second raw sensor data includes:
    defining an observation period window for evaluating the first and/or second raw sensor data;
    defining at least one comparison period within the observation period window;
    subdividing the comparison period into several successive subsections;
    calculating at least one statistical parameter for the first and/or second raw sensor data and/or further raw sensor data within the individual subsections, the statistical parameter being a component of the features;
    determining the timing of changes of the first and/or second control signal within the observation time window; and determining the at least one comparison period between two successive changes of the first and/or second control signals; and controlling the painting plant based on the determined operating state of the painting plant including changing a setpoint value of at least one of the first and second control signals.

2. The monitoring method according to claim 1, further comprising:
 a) detecting a second control signal for controlling the painting plant,
 b) determining the time of changes of the first control signal within the observation time window,
 c) determining the time of changes of the second control signal within the observation time window, and
 d) determining the at least one comparison period between two successive changes of the two control signals.

3. The monitoring method according to claim 1, further comprising:
 a) determining the amount of changes of the first control signal and/or the second control signal,
 b) determining the time period since the last change of the first control signal and/or the second control signal, and
 c) wherein the amount of the changes and the time period since the last change are part of the features.

4. The monitoring method according to claim 1, wherein the comparison period is divided into at least one of the following subsections:
 a) one or more initial regulating phases in which the first raw sensor data responds to a control signal step,
 b) one or more chronologically subsequent regulated phases in which the first raw sensor data have at least partially responded to a control signal step, and
 c) a chronologically subsequent residual phase, until the end of the comparison period.

5. The monitoring method according to claim 4, further comprising:
 a) determining a time constant of the first raw sensor data, and
 b) determining at least one of the following quantities as a function of the time constant of the first raw sensor data:
  b1) Number of regulating phases in the comparison period,
  b2) time duration of the individual regulating phases, and
  b3) time duration of the individual regulated phases.

6. The monitoring method according to claim 4, wherein the time duration of the individual regulating phases and/or the individual regulated phases is determined randomly.

7. The monitoring method according to claim 1, wherein the observation time window is one of the following time periods:
 a) a component-related time period, in particular
  a1) period of a preparation of the painting plant for the coating of a component for the subsequent coating, or
  a2) period of a coating of the component, in particular a body cycle, or
 b) a period of time related to the painting plant, in particular
  b1) duration of a set-up operation of the painting plant,
  b2) duration of a test operation of the painting plant,
  b3) duration of a manual operation of the painting plant,
  b4) duration of a maintenance operation of the painting plant,
  b5) duration of a production operation of the painting plant, or
  b6) period of time of non component-related automated secondary processes of the painting plant, or
 c) a time-related period, in particular
  c1) an hour, a day, a week, a month, a quarter, a year, or
  c2) a shift length of a work shift.

8. The monitoring method according to claim 1, wherein the statistical parameter is one of the following parameters:
 a) a univariate statistical parameter which takes into account only the first raw sensor data, in particular
  a1) arithmetic mean value,
  a2) geometric mean value,
  a3) median value,
  a4) variance,
  a5) maximum value, or
  a6) minimum value, or
 b) a multivariate statistical parameter which, in addition to the first raw sensor data, also takes into account the second raw sensor data and optionally further raw sensor data, in particular
  b1) Pearson correlation coefficient, or
  b2) rank correlation coefficient.

9. The monitoring method according to claim 1, wherein the first raw sensor data and/or second raw sensor data and/or further raw sensor data reproduce one of the following operating variables of the painting plant and/or in that the first control signals and/or the second control signals control one of the following operating variables of the painting plant:
 a) speed of a turbine of a rotary atomizer,
 b) air pressure of drive air for driving a turbine of a rotary atomizer,
 c) coating agent pressure at a paint pressure regulator,
 d) charging current of an electrostatic coating agent charging system,
 e) charging voltage of an electrostatic coating agent charging system,
 f) humidity in a coating booth,
 g) air pressure of shaping air to form a spray of coating agent,
 h) mass flow rate of shaping air for forming a spray of the coating agent,
 i) air temperature in a coating booth,
 j) position of a paint impact point of an application device,
 k) movement speed of a paint impact point of an application device,
 l) valve position of a valve, in particular a coating agent valve, a flushing agent valve, a pulse air valve or a lubricant valve,
 m) drive variable of a drive, in particular of a robot drive, in particular position, speed, acceleration, current, voltage, power, temperature,
 n) flow rate of a coating agent pump or a dosing unit,
 o) position of a linear conveyor which conveys the components to be coated through the applicator,
 p) flow rate, temperature and pressure of material, or
 q) rotational speed of a swirl applicator.

10. The monitoring method according to claim 1, wherein the first raw sensor data and/or second raw sensor data reflect an operating variable of one of the following components of the painting plant:
 a) motor,
 b) robot joint of a coating robot, c) drive controller of a robot drive of a coating robot,
d) turbine for driving a rotary atomizer,
e) shaping air controller for controlling a flow of shaping air to form a spray of an atomizer,
f) coating agent pump,
g) metering device for metering the coating agent,
h) valve,
i) paint pressure regulator,
j) high-voltage generator for electrostatic coating agent charging,
k) switch,
l) sensor,
m) heater,
n) control system,
o) electrical fuse,
p) electric battery,
q) uninterruptible power supply,
r) uninterruptible signal transmission,
s) transformer,
t) fluid lines, or
u) swirl applicator.

11. The monitoring method according to claim 1, further comprising the following step for determining the first raw sensor data:
   a) measuring and storing the first raw sensor data by a first sensor, or
   b) reading the measured and stored first raw sensor data from a database.

12. The monitoring method according to claim 1, further comprising the following step:
   evaluation of the features of the currently determined first raw sensor data and/or the second raw sensor data by means of a machine learning algorithm' for determining the operating state of the painting plant, namely for detecting one of the following operating states of the painting plant:
   a) wear or defect of a paint pressure regulator,
   b) wear or defect of a mixer which mixes several components of a coating agent with each other,
   c) wear or defect of a pump, in particular a coating agent pump,
   d) wear or defect of a valve, in particular a valve for controlling coating, thick matter, adhesive, thinner, air or water,
   e) wear or defect of a heater,
   f) wear or defect of a drive motor,
   g) electrical contact faults,
   h) detection of air entrapment in the paint or interruption of the paint supply,
   i) properties of an operating medium of the painting plant (1), in particular of air, water, lacquer, adhesive, thick matter,
   j) evaluation of the application and movement program for stress on the machine components or equipment,
   k) detection of ejection of a bell plate,
   l) detection of contamination and/or moisture on an atomizer,
   m) detection of anomalies in the operating behavior of motors, pumps, pistons, steering gaps, turbines, high voltage, flow regulators,
   n) general detection of anomalies in the sense of a significant deviation of the signal curve from the normal curve, or
   o) prediction of maintenance intervals.

* * * * *